(No Model.)
E. WESTON.
ELECTRICAL TIME INDICATING APPARATUS.
No. 490,698. Patented Jan. 31, 1893.
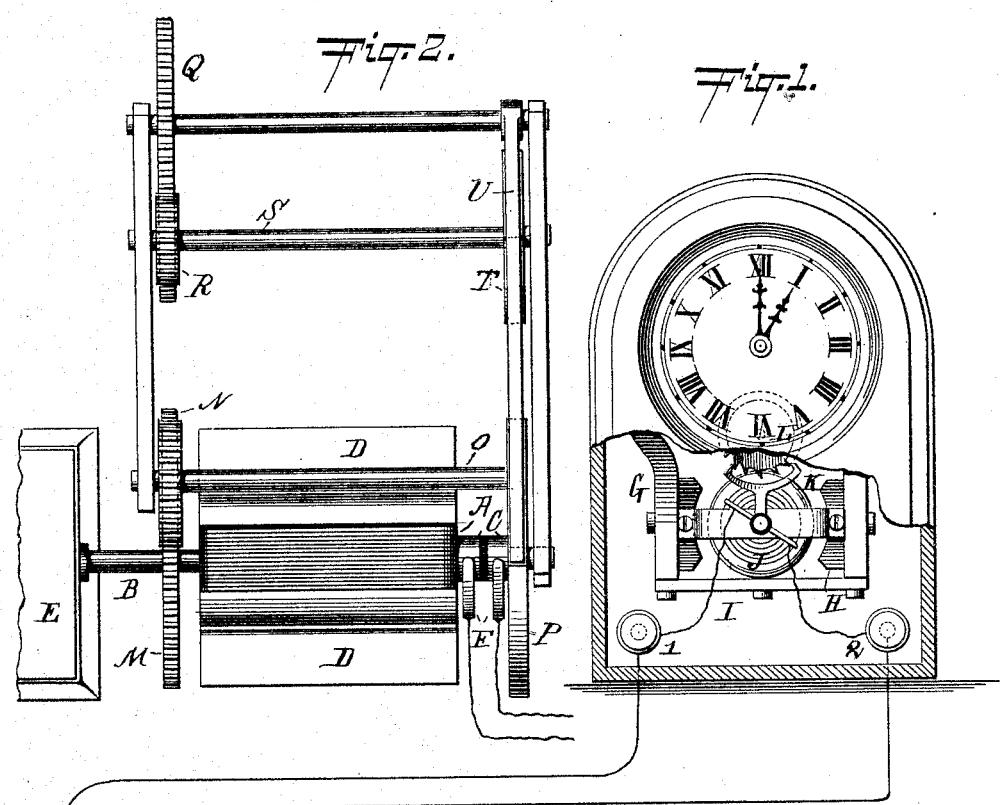
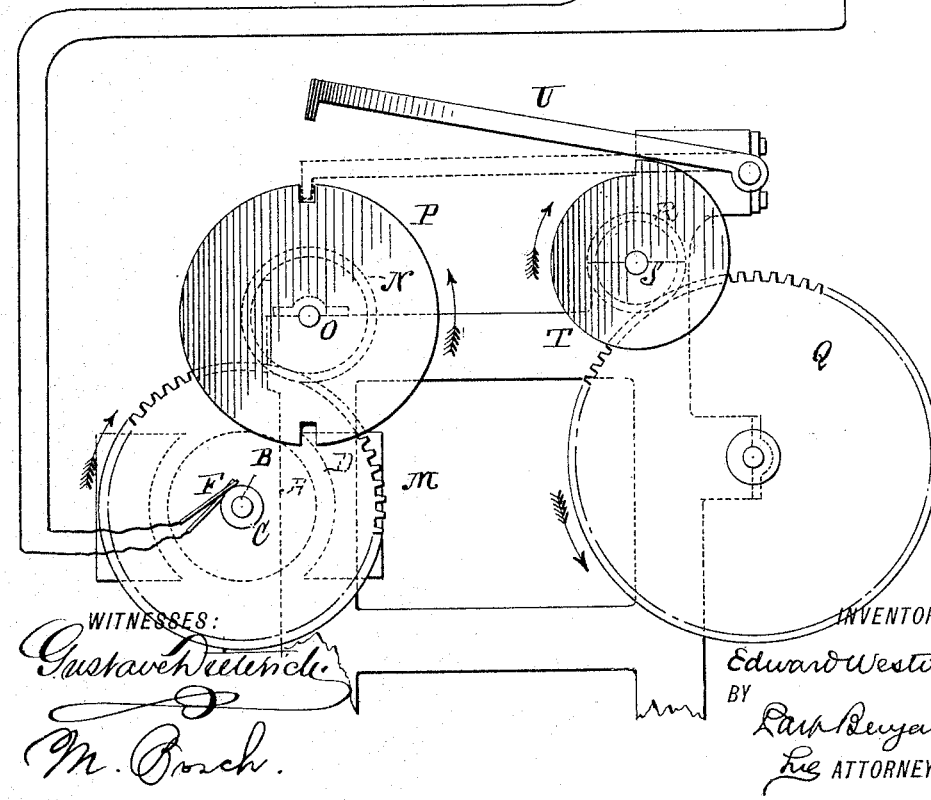
WITNESSES:
Gustave Dieterich
M. Bosch
INVENTOR
Edward Weston
BY
Ralph Benjamin
his ATTORNEY.

UNITED STATES PATENT OFFICE.

EDWARD WESTON, OF NEWARK, NEW JERSEY.

ELECTRICAL TIME-INDICATING APPARATUS.

SPECIFICATION forming part of Letters Patent No. 490,698, dated January 31, 1893.

Application filed June 16, 1891. Serial No. 396,435. (No model.)

*To all whom it may concern:*

Be it known that I, EDWARD WESTON, of Newark, Essex county, New Jersey, have invented a new and useful Improvement in Electrical Indicating Apparatus, of which the following is a specification.

In another application for Letters Patent dated June 4, 1891, Serial No. 395,132, I have described a combination which includes a means of producing a field of force, a loop conductor vibrating therein on the passage of a current through said conductor, and an indicating device actuated by said conductor, the aforesaid apparatus being organized and arranged for the transmission and distribution of time. In said application the means for producing electric impulses upon the circuit is represented symbolically.

My present application relates more particularly to a specific means for causing such impulses, the said means being itself a loop conductor moving in a field of force and connected in circuit with a second loop conductor also movable in a field of force, which second conductor being so actuated, controls the movement of the indicating mechanism. With said first conductor, I may combine a chronometric device so as to render its movement intermittent at definite predetermined intervals. or I may otherwise arrange or actuate said conductor to cause electric impulses at predetermined intervals to traverse the circuit.

In the accompanying drawings, Figure 1 is a front elevation of the apparatus showing an electric clock connected in circuit. Fig. 2 is a plan view of the said apparatus.

Similar letters and figures of reference indicate like parts.

A is an armature of a type commonly used in dynamos and motors, consisting of a central metal core upon which the coil is longitudinally wound. This armature is supported on a shaft B, which carries the insulated metal rings C, to which the coil terminals of the armature are connected. The armature is disposed in the field of the permanent magnets D, and is to be rotated by any suitable motor, indicated at E. In accordance with well-known electrical laws, when an armature disposed, as here shown, is rotated in the field of force of a magnet, the current in the armature coil will reverse at every half revolution; so that for each rotation of the armature caused by the motor E, a direct and reverse current will pass upon the circuit through the brushes F which bear upon the rings C.

The device so far described will be recognized as an alternating current dynamo of very simple type, and needs no further description.

Referring now to Fig. 1, at the upper part of said figure there is shown a clock or time mechanism, the details of which are fully described and claimed in my aforesaid pending application. This mechanism consists of a permanent magnet G having pole pieces H. Between the poles of the electro-magnet extends a brass bar I, which carries a cylinder of iron J. Surrounding this cylinder and supported on a shaft passing through said cylinder, is a coil of insulated wire, not shown, which coil is fast upon said shaft.

The construction and arrangement of the cylinder and coil are fully shown in Letters Patent No. 392,387, granted to me November 6, 1888. The said coil is, therefore, free to vibrate or oscillate in the annular field of force between the cylinder J and the pole pieces H. The circuit connections are such that when a current enters the apparatus at the binding post 1, it is conducted to said movable coil, and from said movable coil to the binding post 2. When a current, as described, passes into said coil, the said coil tends to turn on its axis over an angle depending upon the difference of potential between the terminals of the instrument. When a direct current enters the coil, it turns in one direction, and when a reverse current enters it, it turns in the other direction. Consequently, by sending an alternating current into said coil, it may be caused to vibrate or oscillate to and fro correspondingly to the alternations of the current.

Secured upon the coil shaft is an anchor K which engages with the pallets of an escapement wheel L, and this wheel in turn is geared with an ordinary time train, which actuates the hands of the clock shown. The movement of the hands of the clock may be adjusted relatively to any given number of vibrations of the movable coil; so that, for example, for each vibration of the coil, the minute-hand may be advanced over a certain distance in arc on the face of the clock. It will be obvious that all that is necessary is to send impulses over the line at predetermined intervals to cause the clock hands to move correspondingly, and thus to indicate time when the electric impulses are controlled by a chronometric device.

In my simultaneously-pending application before named, I have illustrated, symbolically, a means of causing electrical impulses to traverse the line at certain intervals. As by the movement of a pendulum, closing contacts with a battery; and in said application, I have broadly claimed any means of producing a like result. In my present application, I describe a specific means for the same purpose; the object being to do away with metallic contacts and also with a battery. The energy of a battery is, of course, always variable, and it is necessary always to provide battery power sufficient for the pupose needed, despite any probable fluctuations. So also, the presence of contacts is objectionable owing to their difficulty in maintenance and liability to injury by the effects of the current passing through them. I therefore substitute in my present invention for the battery and the pendulum or other equivalent means described in my application aforesaid, the armature A, rotating, as described, between the magnet D and producing at the brushes F an alternating current. This current, obviously, if conducted to the mechanism already described, would cause an oscillation of the coil once for every half revolution of the armature; and this oscillation would continue for as long as the armature kept up its rotation, but it is desired that the impulse which actuates the clock mechanism should pass thereto only at certain predetermined intervals, which intervals are to be chronometrically regulated. For this purpose, I provide the simple apparatus which is illustrated in the lower portion of Fig. 1. On the armature shaft B is arranged a gear M, which engages with a pinion N upon the shaft O. The shaft O carries the notched wheel P; the notches of the said wheel being disposed diametrically opposite one another. The arrangement is to be such that for every half revolution of the armature, the notched wheel P is to make either a half revolution or some multiple thereof.

At Q is shown a gear which is driven by any chronometric device; as, for example, said wheel Q may be part of the train of an ordinary chronometer or clock, making one revolution for a minute, for example. This wheel Q gears with a pinion R which is on the shaft S; and on the said shaft there is carried a cam wheel T.

U is a pivoted dog which rests upon the periphery of the cam wheel T, and is lifted by the said cam wheel once during every revolution thereof. The bent-over extremity of the dog rests upon the periphery of the notched wheel P, and therefore readily falls into one of the notches on said wheel. When this occurs, the wheel P is prevented from moving; and thus the armature A is also prevented from rotating, and consequently no current passes to the clock. When, however, the cam wheel R lifts the dog U, then the wheel P is free to rotate, and hence the armature A is free to be driven by its motor, and as a consequence, an alternating current passes to the movable coil of the clock mechanism causing the same to vibrate until the dog U once more comes into engagement with a notch on the wheel P. It will readily be understood that if the wheel Q rotates once in a given time, the dog U will be lifted at regular intervals, and hence the armature A will be allowed to rotate at such intervals and the alternating current therefrom will operate the movable coil and clock mechanism for a definite period of time, thereby advancing the hands and causing said time period to be indicated on the dial.

It is distinctly to be understood that I do not limit myself to the specific releasing apparatus or to the specific arrangement of current-producing apparatus, or the combination of one with the other, as here shown. Neither do I limit myself, in anywise, to the specific proportions of gearing as indicated in the drawings. The arrangement of the armature A and of the gearing wheels M N P, on the one hand, and of the wheel Q with the pinion P and cam wheel T and pivoted dog U, on the other, is intended to be merely symbolical, and not to represent a working apparatus. Such an apparatus, however, from the description above given, can easily be proportioned, constructed and arranged by any electrical workman or clock-maker from his knowledge of the art. It is also to be understood that I may vary the current producing apparatus greatly from that which is shown here. Thus I may employ (a) a dynamo giving a continuous direct current, mechanically interrupted at predetermined intervals, (b) a dynamo giving an interrupted direct current, the speed of the dynamo being regulated to a given number of revolutions per minute, (c) a dynamo giving a continuous alternating current mechanically interrupted at predetermined intervals, (d) a dynamo giving an interrupted alternating current, the speed of the dynamo being regulated to a given number of revolutions per minute, (e) a dynamo giving a continuous alternating current, so constructed that the alternations occur at certain predetermined intervals.

Under the conditions noted in the above clauses (a) and (b), the direct current moving the distant coil in one direction only, means, such as a retracting spring acting upon said coil, are to be provided for moving said coil in the opposite direction.

I claim:—

1. Two loop conductors connected in circuit and movable in fields of force, and in combination with one of said conductors, a means of operating the same and thereby causing a series of electric impulses to traverse the second conductor at predetermined intervals, and in combination with said second conductor, an indicating device for showing the movement thereof.

2. Two loop conductors connected in circuit, and pivoted in fields of force, and in combination with one of said conductors a means of vibrating, oscillating or rotating the same at predetermined intervals and thereby causing a series of electric impulses to traverse the second conductor, and a time indicating device controlled by the movement of said second conductor.

3. Two loop conductors connected in circuit and pivoted in fields of force, and in combination with one of said conductors and actuating the same a motor and a means of arresting the movement of said motor at predetermined intervals, and in combination with the other conductor and controlled by the movement thereof, a time indicating mechanism.

4. Two loop conductors connected in circuit and pivoted in fields of force, and in combination with one of said conductors and actuating the same a motor and a means of arresting the movement of said conductor at predetermined intervals, and in combination with the other conductor and controlled by the movement thereof a time indicating mechanism.

5. The combination of a dynamo electric machine, a means of actuating the same at predetermined intervals, a loop conductor vibrating or oscillating in the field of force and in circuit with said dynamo, and a time train controlled by said loop conductor.

6. The combination of a dynamo electric machine, a means of actuating the same at predetermined intervals, a loop conductor vibrating or oscillating in the field of force and in circuit with said dynamo, and a time train controlled by the said loop conductor.

7. The combination of an alternating current dynamo electric machine, a means of actuating or arresting the same at predetermined intervals, a loop conductor vibrating or oscillating in the field of force and in circuit with said dynamo, and a time train controlled by said loop conductor.

8. Transmitting time electrically by causing a loop conductor moving in a field of force to produce electric impulses of definite duration and frequency in a circuit including a second coil located in a field of force at a distant station and thereby, through the movement of said coil, controlling at said station a time indicating mechanism.

9. Transmitting time electrically by intermittently actuating at definite chronometric intervals a loop conductor in a field of force, and thus causing electric impulses of definite duration and frequency to be produced in a circuit including a second coil located in a field of force at a distant station and thereby through the movement of said coil controlling at said station a time indicating mechanism.

10. Transmitting time electrically by intermittently at definite chronometric intervals arresting the movement of a loop conductor moving in a field of force and thus causing electric impulses of definite duration and frequency to be produced in a circuit including a second coil located in the field of force at a distant station and thereby, through the movement of said coil, controlling at said station a time indicating mechanism.

11. A coil rotary in a field of force, a motor actuating said coil, a stop or catch on the coil axis, a dog or latch engaging with said stop, a chronometric mechanism controlling said dog, and in circuit with said coil a second coil movable in a field of force, and an indicating device for showing the movement of said second coil; the said dog being controlled by said chronometric mechanism to engage with said stop and so to arrest the movement of said coil at definite time intervals, thereby interrupting the generation of the current in a circuit and producing a series of electric impulses which actuate said second coil and cause said intervals to be shown by said indicating device.

12. The combination of a dynamo, a motor driving the same, a notched wheel or disk on the armature shaft of the dynamo, a dog engaging with said notched disk, a chronometric mechanism controlling said dog to cause said engagement at definite time intervals, and in circuit with said dynamo a coil rotary, vibrating or oscillating in a field of force, and a time train controlled by the movement of said coil.

EDWARD WESTON.

Witnesses:
R. C. FESSENDEN,
A. F. CONERY, Jr.